Patented Aug. 21, 1928.

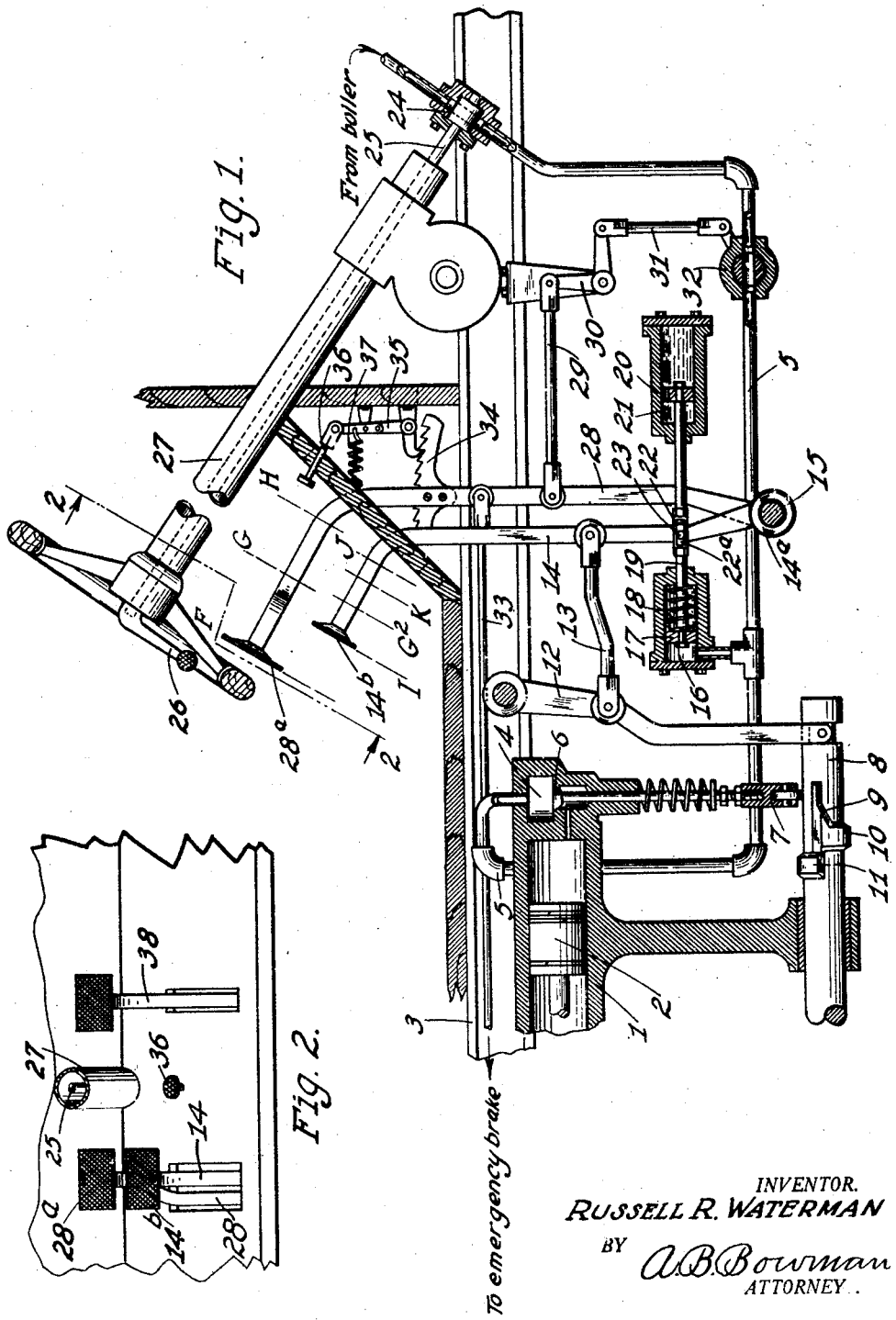

1,681,508

UNITED STATES PATENT OFFICE.

RUSSELL R. WATERMAN, OF LONG BEACH, CALIFORNIA, ASSIGNOR TO FARMERS' NATIONAL BANK, TRUSTEE, OF GREENVILLE, OHIO, A CORPORATION OF OHIO.

OPERATING CONTROL MEANS FOR AUTOMOTIVE STEAM POWER PLANTS.

Application filed May 17, 1926. Serial No. 109,568.

My invention relates to driving or operating control means for steam operated automotive power plants and particularly, in connection with automotive vehicles propelled by steam power plants.

The objects of my invention are: first, to provide a driving or control means for steam operated automotive power plants which is particularly simple and effective and practically fool-proof in construction and operation; second, to provide a means of this class for automotive, steam propelled vehicles having foot pedal means adapted to be operated by one foot and which is so constructed as to serve as a throttle means for shifting and controlling the valve means for the engine of the vehicle, as a clutch and also as a brake means, or any of them; third, to provide a driving or control means of this class which is particularly desirable and practical in traffic in that both hands of the operator may be free for controlling the steering wheel, for signaling or for other purposes; fourth, to provide a pair of pedals for a means of this class, the one for controlling and shifting of the valves for the steam engine of the vehicle and the other for controlling an auxiliary throttle and a brake means, the former being adapted to be shifted or depressed by the latter when the latter is depressed a predetermined distance; fifth, to provide as a whole a novelly constructed driving or operating control means for steam propelled automotive vehicles, and sixth, to provide means of this class which is durable, efficient, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a diagrammatic view of the fragmentary portion of a steam propelled automotive vehicle, showing my driving or operating control means incorporated therewith, certain parts and portions of the propelling steam engine, of the frame and of my driving or operating control means being broken away and in section to facilitate the illustration; Fig. 2 is a sectional view thereof taken at 2—2 of Fig. 1, showing the relation of the several operating pedals with each other and with the steering post.

Like characters of reference refer to similar parts and portions throughout the several views of the drawings.

The operating steam engine cylinder 1, piston 2, vehicle frame 3, steam chest 4, steamline 5, valve 6, valve lifter 7, cut-off cam supporting and operating shaft 8, short and graduated cut-off cam 9, long cut-off cam 10, reverse cam 11, cam shifting arm 12, link 13, foot pedal 14, foot pedal supporting rod 15, cam control cylinder 16, piston 17, spring 18, piston rod 19, oil dash-pot piston 20, oil dash-pot 21, slotted connecting link member 22, pin 23, main throttle valve 24, throttle valve operating rod 25, throttle shifting lever 26, steering post 27, emergency throttle and brake pedal 28, link 29, bell crank 30, link 31, auxiliary throttle valve 32, emergency brake controlled rod 33, pedal retaining quadrant 34, pawl 35, brake button 36, and the spring 37 constitute the principal parts and portions of my operating control means for steam operated automotive power plants.

The operating or power steam cylinder 1 of the engine and the piston 2, mounted therein, may be of any suitable construction for propelling the vehicle, and may be supported in any convenient manner on the frame thereof. At the head end of the cylinder is provided a steam chest 4, which is connected by means of the conductor 5 with a boiler, not shown. Said steam chest communicates with the steam cylinder in any suitable manner. In the steam chest 4 is reciprocally mounted a tappet valve 6, which is actuated by a suitable valve lifter 7 adapted to be engaged by and lifted by a series of connected cams 9 mounted on a revoluble and reciprocating cam carrying shaft 8. Said cams consist of a short and graduated cut-off cam 9, a long cut-off cam 10 and a reverse cam 11, substantially as shown in Fig. 1.

On the frame 3 of the vehicle is pivotally mounted the cam shifting arm 12, which is pivotally connected at its free end to the shaft 8, and intermediate its ends, by means of a link 13, to intermediate the ends of the foot pedal 14, which is pivotally mounted at its one end 14$^a$ on the rod 15, the opposite end of the foot pedal being provided with a suitable foot plate 14$^b$.

The steam conducted through the conductor 5 to the steam cylinder 1 is controlled by a main throttle valve 24 positioned in the steamline. Said throttle valve is actuated by a rod 25 extending through the steering post 27 of the vehicle and is provided at the end extending above the steering post with a manual operating lever 26.

Connected to the steam conductor 5 intermediate the main throttle valve 24 and the steam chest 4 is an operating or cut-off cam control cylinder 16, said conductor being connected with the one end of said cylinder 16. In said cylinder is reciprocally mounted a piston 17 between which and the opposite end of the cylinder is positioned a compression spring 18 for normally forcing the piston against the steam pressure in the cylinder. To the piston 17 is connected a rod 19, which extends from the cylinder 16 and is connected at its opposite end to a ported piston 20 reciprocally mounted in the dash-pot 21 filled with oil or other suitable liquid. Intermediate the ends of the rod, or rod sections 19, is provided a link 22, which is longitudinally slotted, as indicated by 22$^a$. Into said slotted portion extends a pin 23 mounted on the foot pedal 14 intermediate its pivotal mounting and its pivotal connection with the link 13.

On the rod 15 is pivotally mounted the one end of the emergency throttle and brake pedal 28, the foot plate portion 28$^a$ of which extends above the floor boards in the operator's compartment of the vehicle above and normally forwardly of the foot plate portion 14$^b$ of the cam control foot pedal, as shown by solid lines in Fig. 1. Said foot pedal 28 is pivotally connected intermediate its ends, by means of a link 29, to one of the arms of a bellcrank 30, the other arm of which is pivotally connected, by means of a link 31, with the operating arm of the auxiliary or pedal operated throttle 32 positioned in the steamline between the main throttle and the cam control cylinder 16.

The pedal 28 is also pivotally connected intermediate its ends, by means of a rod or rods 33, to the emergency brake mechanism of the vehicle (not shown).

Intermediate the ends of the pedal 28 and preferably underneath the floor boards of the vehicle is provided a notched quadrant 34, which is adapted to be engaged by a pawl 35 and normally held in its disengaged position by a spring 37 connected with the pawl. At the upper end of the pawl is connected a plunger or button 36, which extends beyond the floor boards of the vehicle and is adapted to be depressed by the foot when desiring to latch the brake or the throttle.

The arrangement of the two foot pedals 14 and 28, described above, with the steering post 27, the emergency throttle and brake pedal release plunger 36 and the service brake pedal 38 is shown in Fig. 2.

In starting the vehicle, the pedal 28 is depressed to the position shown by the dotted lines and designated G. Simultaneously with the depressing of the pedal 28, the pedal 14 is depressed by the same foot to the dotted line position designated G$^2$, it being here noted that the plates at the free ends of the foot pedals are so arranged that when the pedal 28 is depressed, the pedal 14 is depressed simultaneously and to substantially the same extent after the pedal 28 has been depressed a predetermined distance. The shifting of the cam control pedal 14 to the position referred to above places the cut-off cam in the intermediate position so that the engine will start smoothly. The manually operated throttle lever 26 is then shifted to open the main throttle valve 24 to any desired maximum speed. The pedals 28 and 14 are then permitted to gradually come back and assume their normal operating positions. The steam from the steamline is thus admitted to the engine and at a speed at which the pedal 28 is permitted to recede or return. The pedal 14, being in the intermediate position when the release motion of the pedal is started, permits very smooth starting of the engine. However, if the pedal 14 should, by accident or otherwise, be released before the car is started, the automatic cam control steam cylinder and piston therein will force the cam forward to the required cut-off position to start the engine. The cam control steam cylinder and piston, together with the spring 18 and dash-pot 21, are also brought into play if the vehicle is started entirely by the throttle lever 26, providing the pedal 28 is in the position indicated by F. It will be readily seen that when handling a car in traffic the pedal 28 only needs to be operated, the pedal 14 being automatically operated, thus leaving the hands entirely free for operating the steering wheel, for signaling and the like. It will be here noted that when the throttle lever 25 is once set for the desired maximum speed, the same need not be operated until a change of maximum speed is desired.

The dotted line position, indicated by H in Fig. 1, is the extreme inward position of the pedal 28 when both the auxiliary throttle is closed and the emergency brakes applied.

The dotted line positions, indicated by K and J, of the pedal 14, are the positions of the same for shifting respectively the long cut-off cam 10 and the reverse cam 11 into operative engagement with the valve tappet.

Though I have shown and described a particular construction, combination and arrangement of parts and portions, I do not wish to be limited to this particular construction, combination and arrangement, but desire to include in the scope of my invention, the construction, combination and arrangement substantially as set forth in the appended claims.

Having thus described my invention, what I claim as new and desire to secure by Letters Patent is:

1. In a means of the class described, the combination with a steam engine, a steamline connected therewith and a brake means, of a throttle positioned in said steamline, a combined manual means connected with said throttle and said brake means for operating said throttle or both said throttle and said brake means, a cut-off valve in connection with the engine, and means for controlling the cut-off valve, said means being operable when the manual means is operated.

2. In a means of the class described, the combination with a steam engine, a steamline connected therewith and a brake means, of a throttle positioned in said steamline, a foot pedal connected with said throttle and said brake means for operating the former or both the former and the latter, and a cut-off valve operating pedal for controlling the steam cut-off valve to said steam engine, said operating pedal being positioned in association with said first mentioned foot pedal whereby said operating pedal may be simultaneously operated with the operation of the first mentioned foot pedal.

3. In a means of the class described, the combination with a steam engine, a steamline connected to said engine and valve means for automatically controlling the flow of steam to said engine, of a manual means for shifting said valve means, a throttle in said steamline, and another manual means in connection with said throttle for operating the same, said last mentioned manual means being positioned in association with the former manual means whereby said former manual means may be shifted with the shifting of the other manual means.

4. In a means of the class described, the combination with a steam engine, a steamline connected to said engine and valve means for automatically controlling the flow of steam to said engine, of a foot pedal connected with said valve means for shifting the same, a throttle positioned in said steamline, and a throttle foot pedal connected with said throttle, said first mentioned foot pedal being so positioned relative to the throttle foot pedal so that the former may be depressed when the latter is depressed.

5. In a means of the class described, the combination with a steam cylinder, a valve for admitting steam to said cylinder, cam means for controlling said valve, a steamline communicating with said cylinder, and a foot pedal connected with said cam means for shifting the same, of a cam control steam cylinder connected with said steamline, a reciprocating means mounted in said cam control cylinder and connected with said foot pedal, a throttle in said steamline on the opposite side of said cam control steam cylinder from said first mentioned steam cylinder, and a foot pedal connected with said throttle.

6. In a means of the class described, the combination with a steam cylinder, a valve for admitting steam to said cylinder, cam means for controlling said valve, a steamline communicating with said cylinder, and a foot pedal connected with said cam means for shifting the same, of a cam control steam cylinder connected with said steamline, a reciprocating means mounted in said cam control cylinder and connected with said foot pedal, a throttle in said steamline on the opposite side of said cam control steam cylinder from said first mentioned steam cylinder, and a foot pedal connected with said throttle, the latter foot pedal being positioned in association with said first mentioned foot pedal in such a manner that the former may be shifted when the second mentioned foot pedal is shifted.

7. In a means of the class described, the combination with a steam cylinder, a valve for admitting steam to said cylinder, cam means for controlling said valve, a steamline communicating with said cylinder, a foot pedal connected with said cam means for shifting the same, and a brake means, of a cam control steam cylinder connected with said steamline, a reciprocating means in said cam control cylinder and connected with said foot pedal, a throttle in said steamline on the other side of said valve control steam cylinder from said first mentioned steam cylinder, and a throttle and brake pedal connected with said throttle and said brake means, said throttle and brake pedal being positioned in association with and outwardly from said first mentioned foot pedal in such a manner that the first mentioned foot pedal may be depressed by depressing said throttle and brake foot pedal.

8. In a means of the class described, the combination with a steam engine and a steamline communicating therewith, of a manually controlled throttle in said steamline, an auxiliary throttle positioned in said steamline intermediate said engine and said first mentioned throttle, manual means for controlling said auxiliary throttle, and other manual means for controlling the first throttle, the two mentioned means being so arranged as to be operated simultaneously.

9. In a means of the class described, the combination with a steam engine, a steamline communicating with said cylinder, and a brake means, of a manually controlled emergency throttle in said steamline, an auxiliary throttle positioned in said steamline intermediate said engine and said first mentioned throttle, and a combined emergency throttle and brake control means in connection with said auxiliary throttle and said brake means whereby said auxiliary throttle is automatically actuated when said brake means is applied.

10. In a means of the class described, the combination with an operating steam cylinder, a valve for admitting steam to said cylinder, cam means for controlling said valve, a steamline communicating with said operating steam cylinder, and a brake means, of a valve control foot pedal for shifting said valve, a steam throttle in said steamline, an auxiliary steam throttle in said steamline between said operating steam cylinder and said first mentioned steam throttle, and an emergency throttle and brake pedal connected with said auxiliary steam throttle and said brake means, said foot pedals being positioned in association with each other in such a manner that the valve controlling foot pedal may be depressed when said emergency throttle and brake pedal is depressed a predetermined distance.

11. In a means of the class described, the combination with an operating steam cylinder, a valve for admitting steam to said cylinder, cam means for controlling said valve, and a steamline communicating with said cylinder, of a steam throttle in said steamline, a cam control steam cylinder connected with said steamline intermediate said throttle and said operating steam cylinder, a reciprocating means in said cam control steam cylinder, a cam control foot pedal operatively connected with said valve and with said reciprocating means whereby said foot pedal is actuated by said reciprocating means and whereby said foot pedal may be operated independently of said reciprocating means, an auxiliary steam throttle positioned between said first mentioned throttle and said cam control steam cylinder, and an emergency throttle foot pedal connected with said auxiliary steam throttle, said foot pedals being positioned in association with each other and in such a manner that the cam control foot pedal may be depressed simultaneously with said emergency throttle foot pedal after the latter is depressed a predetermined distance.

In testimony whereof, I have hereunto set my hand at Los Angeles, California, this 10th day of May, 1926.

RUSSELL R. WATERMAN.